US009591164B2

(12) United States Patent
Shimizu

(10) Patent No.: US 9,591,164 B2
(45) Date of Patent: Mar. 7, 2017

(54) IMAGE PROCESSING APPARATUS, NON-TRANSITORY STORAGE MEDIA AND CONTROL METHOD THEREOF FOR GENERATING OPERATION SCREEN TO UTILIZE VARIOUS APPLICATIONS FOR EXECUTING IMAGE PROCESSING FUNCTIONS

(71) Applicant: CANON KABUSHIKI KAISHA, Tokyo (JP)

(72) Inventor: Yasutomo Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/712,201

(22) Filed: May 14, 2015

(65) Prior Publication Data

US 2015/0341518 A1 Nov. 26, 2015

(30) Foreign Application Priority Data

May 22, 2014 (JP) ................................ 2014-106458

(51) Int. Cl.

*H04N 1/00* (2006.01)
*H04L 29/08* (2006.01)
*G06F 3/12* (2006.01)

(52) U.S. Cl.

CPC .......... *H04N 1/00973* (2013.01); *G06F 3/12* (2013.01); *H04L 67/02* (2013.01); *H04N 1/00* (2013.01); *H04N 1/00209* (2013.01); *H04N 1/00278* (2013.01); *H04N 1/00405* (2013.01); *H04N 1/00938* (2013.01); *H04N 2201/0074* (2013.01); *H04N 2201/0081* (2013.01); *H04N 2201/0082* (2013.01); *H04N 2201/0093* (2013.01); *H04N 2201/0094* (2013.01)

(58) Field of Classification Search

None

See application file for complete search history.

(56) References Cited

U.S. PATENT DOCUMENTS

2006/0126110 A1* 6/2006 Ohara ................ H04N 1/00209 358/1.15
2012/0113467 A1* 5/2012 Ito ...................... H04N 1/00222 358/1.15
2013/0003102 A1* 1/2013 Edgar ................. G06F 9/44505 358/1.13
2013/0235421 A1* 9/2013 Ono ..................... H04N 1/0023 358/1.15

FOREIGN PATENT DOCUMENTS

JP 2012-105071 A 5/2012

* cited by examiner

*Primary Examiner* — Benny Q Tieu
*Assistant Examiner* — Haris Sabah
(74) *Attorney, Agent, or Firm* — Carter, DeLuca, Farrell & Schmidt, LLP

(57) ABSTRACT

Provided is an image processing apparatus having a web browser and a control method thereof. The image processing apparatus has an application that executes a function of the image processing apparatus. When a control request is received from the web browser, a corresponding application is executed by loading a class of the corresponding application and calling an execution function.

13 Claims, 21 Drawing Sheets

F I G. 5A
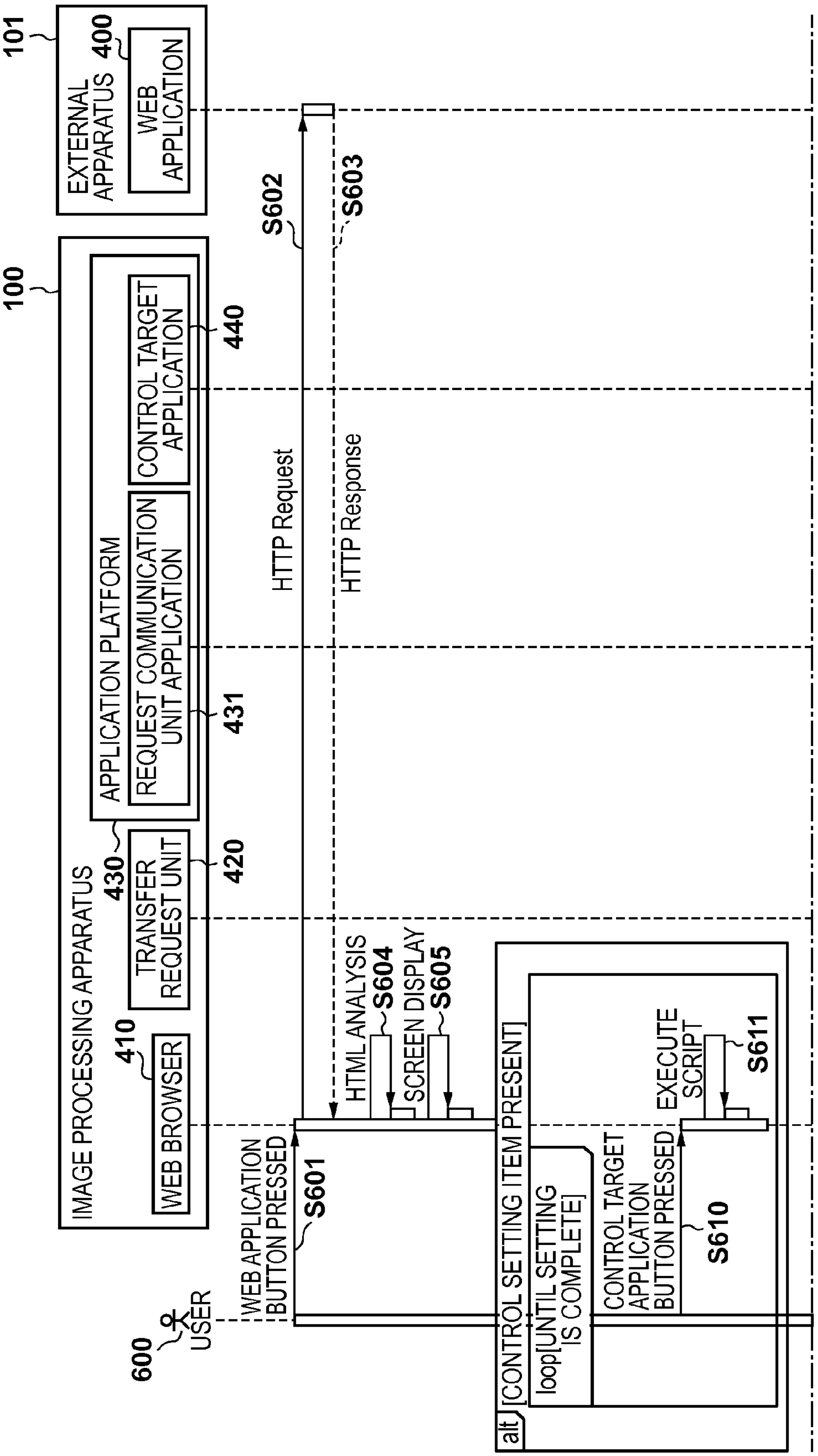

F I G. 5B
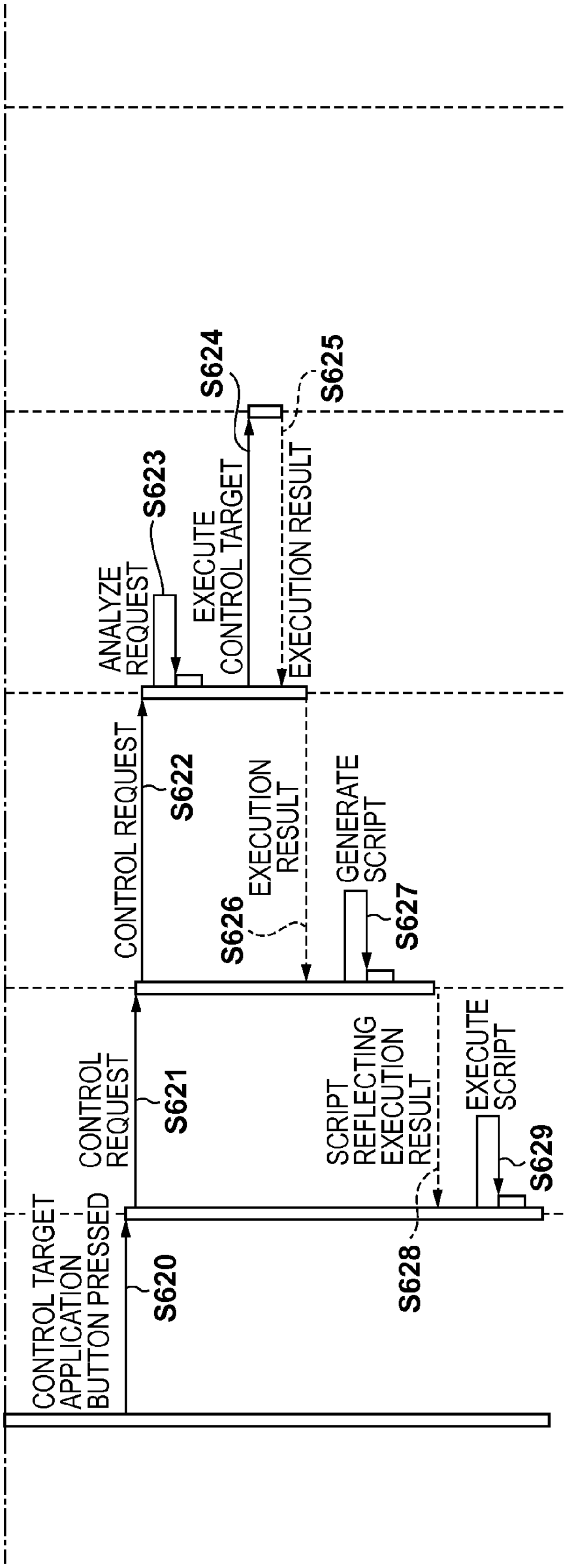

F I G. 6
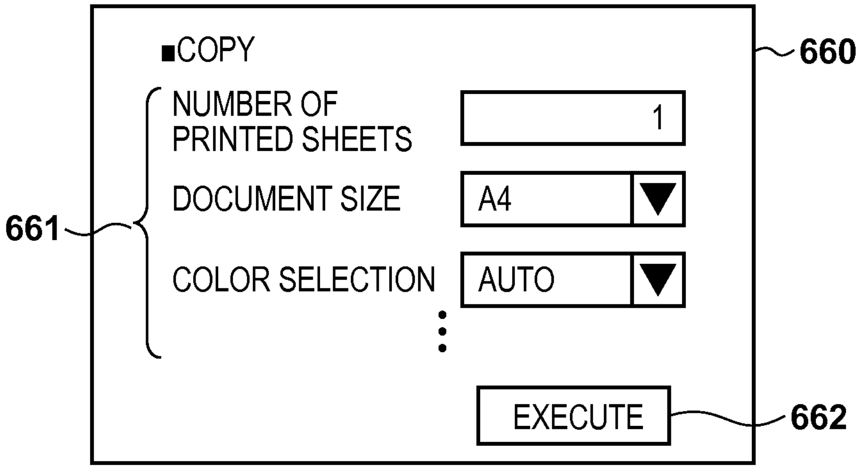

FIG. 7

```
<!DOCTYPE HTML PUBLIC "-//W3C//DTD HTML 4.01 Transitional//EN">
<html>
        <head>
                <meta http-equiv="Content-Script-Type" content="text/javascript">
701             <script type="text/javascript"src=JSAPI.js></script>
                <script type="text/javascript">
                        var api = new api();
702a
                        function Init()
                        {
                                document.getElementsByNames("Num").value=1;
                        }
                        function MediumCahge()
                        {
702b                            var size = document.getElementsByNames("Size");
                                var index = size.selectedIndex;
                                api.setCopiesSize(size.options[index].value);
                        }
                        //PROCESSING FOR SCREEN CONTROL SETTINGS,
                        CONTROL TARGET APPLICATION SETTINGS, AND SO ON
                        CONTINUES HEREAFTER
                        ...

                        function startAppli()
                        {
                                var textForm = document.getElementsByNames("Num");
702c                            api.setCopiesNum(textForm.value);
                                var returnResult = api.startApplication();
                                alert(api.getReturnAppli());   702d
                        }
                </script>                                                        702
        </head>
        <body onload="Init()">
                <h1>■COPY</h1>
                <h2>NUMBER OF PRINTED SHEETS </h2>
                        <input type="text" name="Num" value="">
                <h2>DOCUMENT SIZE </h2>
                        <select name="Size" onChange="MediumChange()">
                                <option value="A4">A4</option>
                                <option value="A3">A3</option>
703a                            <!- -NECESSARY DOCUMENT SIZE SETTINGS
                                CONTINUE HEREAFTER - ->                          703
                                ...

                        </select>
                <!- -SCREEN CONTROL SETTINGS, CONTROL TARGET
                APPLICATION SETTINGS, AND SO ON CONTINUE HEREAFTER - ->
                ...
703b
                <input type="button" value="EXECUTE" onClick="startAppli();"/>
        </body>
</html>
```

F I G. 8

800

```
var api = (function() {
        function api() {                                                              801
801a            this.copies = new Array("CopyAppli/copy_sample.jar","copy.CopyJob");

                this.copiesNum = 1;
                this.copiesSize = "A4";
801b            //CONTROL TARGET APPLICATION VARIABLES CONTINUE HEREAFTER
                ...

801c            this.returnString = "null";
        }

        api.prototype.setCopiesNum = function(num) {                                   802
                this.copiesNum = num;
        }
        api.prototype.setCopiesSize = function(size) {
                this.copiesSize = size;
        }
        //CONTROL TARGET APPLICATION VARIABLE STORAGE FUNCTION
        CONTINUES HEREAFTER
        ...

        api.prototype.getCopiesNum = function() {
                return this.copiesNum;
        }
        api.prototype.getCopiesSize = function() {
                return this.copiesSize;
        }
        //CONTROL TARGET APPLICATION VARIABLE OBTAINMENT FUNCTION
        CONTINUES HEREAFTER
        ...

        api.prototype.startApplication = function() {                                  803
                copies.push("##START_METHOD##", "setNumberOfCopies", this.copiesNum,
803a "##END_METHOD##");
                copies.push("##START_METHOD##", "startCopy", null, "##END_METHOD##");
                //FUNCTION SETTINGS REQUIRED TO EXECUTE CONTROL TARGET
                APPLICATION CONTINUE HEREAFTER
        803b    ...

                startAppli (copies);
        }

804a    api.prototype.returnAppli = function(str) {                                    804
                this.returnString = str;
        }
804b    api.prototype.getReturnAppli = function() {
                return this.returnString;
        }

        return api;
})();
```

EXAMPLE OF PROCESSING RESPONSE OF REQUEST TRANSFER UNIT(1/2)

```
#include <iostream>
#include <string>
#include <stdlib.h>
#include <string.h>
#include <stdio.h>
#include <sys/types.h>
#include <sys/socket.h>
#include <netinet/in.h>
#include <netdb.h>
using namespace std;

#include <JavaScriptCore/JavaScript.h>

static void JSBindStart(void)
{
        JSGlobalContextRef ctx = WebKitGetGlobalJSContextRef();
        JSObjectRef global = JSContextGetGlobalObject(ctx);
        JSObjectRef   func   =   JSObjectMakeFunctionWithCallback(ctx,   NULL,
(JSObjectCallAsFunctionCallback)JSGlobalStart);
        JSStringRef jsname = JSStringCreateWithUTF8CString("startAppli");
        JSObjectSetProperty(ctx, global, jsname, func, 0, NULL);
        JSStringRelease(jsname);
}

static JSValueRef JSGlobalStart(JSContextRef ctx,
                                JSObjectRef function,
                                JSObjectRef thisObject,
                                size_t argumentCount,
                                const JSObjectRef argments[ ],
                                JSValueRef* exception)
{
        if (argumentCount) {

                JSStringRef jstrArg = JSValueToStringCopy(ctx, arguments[0], exception);
                size_t len = JSStringGetMaximumUTF8CStringSize(jstrArg);
                char* szArg = (char*)malloc(len);
                JSStringGetUTF8CString(jstrArg, szArg, len);

                int dstSocket;
                struct sockaddr_in dstAddr;
                struct hostent *hp;
                int    numrcv = -1;
```

901 (#include <JavaScriptCore/JavaScript.h>), 902a (JSBindStart), 902b (JSGlobalStart), 902c, 902d, 902

↓FROM FIG. 9

902d, 902e, 902f, 902g, 902h

```
bzero(static_cast<char *>(&dstAddr), sizeof(dstAddr));
dstAddr.sin_family = AF_INET;
dstAddr.sin_port = htons(5550);
hp = gethostbyname("192.168.xx.xxx");
bcopy(hp->h_addr, &dstAddr.sin_addr, hp->h_length);

dstSocket = socket(AF_INET, SOCK_STREAM, 0);
if (connect(dstSocket, static_cast<struct sockaddr *>(&dstAddr), sizeof(dstAddr)) < 0)
{
          return NULL;
}

char buf[256], receive[256];
memset(buf, 0, sizeof(buf));
memset(receive, 0, sizeof(receive));
strcpy(buf, static_cast<const char*>(szArg));
write(dstSocket, buf, static_cast<int>(strlen(buf)));
while (true) {
          numrcv = read(dstSocket, receive, static_cast<int>(sizeof(receive)) - 1);
          if (numrcv != -1) {
                    break;
          }
}
close(dstSocket);

JSStringRelease(jstrArg);
free(szArg);
string returnNumber;
switch (receive) {
          case 0:
                    returnNumber = "Completed";
                    break;
          case 1:
                    returnNumber = "ERROR 0001"
                    break;
          //SETTINGS BASED ON EXECUTION RESULT CONTINUE HEREAFTER
          ...

          default:
                    returnNumber = "ERROR 9999"
                    break;
}
string returnResult = "api.prototype.returnAppli("" + returnNumber +"");";
JSStringRef jstrReturn = JSStringCreateWithUTF8CString(returnResult.c_str());

JSEvaluateScript(ctx, jstrReturn, NULL, NULL, 0, NULL);
JSStringRelease(jstrReturn);
     }
     return JSValueMakeUndefined(ctx);
}
```

EXAMPLE OF PROCESSING RESPONSE OF REQUEST PROCESSING UNIT APPLICATION(1/4)

```
import java.io.*;
import java.net.*;
import java.lang.reflect.*;
import java.util.StringTokenizer;

public class RequestCommunication {

        public void socketStart() {
                boolean readingState = true;
                try {
                        ServerSocket serverSocket = new ServerSocket(5550);
                        Socket clientSocket = serverSocket.accept();

                        BufferedWriter out = new BufferedWriter(new OutputStreamWriter
(clientSocket.getOutputStream()));

                        InputStream is = clientSocket.getInputStream();
                        BufferedReader in = new BufferedReader(new InputStreamReader(is));
                        char data[ ];
                        int returnResult;
                        while (readingState) {
                                while (is.available() >= 0) {
                                        if (is.available() = = 0) {
                                                readingState = false;
                                                continue;
                                        }
                        1101a {         data = new char[is.available()];
                                        in.read(data,0,is.available());

                        1102 ~          returnResult = appliCheck(data);

                        1101b {         out.write(returnResult);
                                        out.flush();
                                        Thread.sleep(100);
                                }
                        }

                        out.close();
                        in.close();
                        clientSocket.close();
                        serverSocket.close();
                } catch (IOException ie) {
                        readingState = false;
                        //ERROR PROCESSING CONTINUES HEREAFTER
                        ...
                }
                //catch STATEMENT CORRESPONDING TO ERROR CONTINUES HEREAFTER
                ...

        }
```

EXAMPLE OF PROCESSING RESPONSE OF REQUEST PROCESSING UNIT APPLICATION(2/4)
↓FROM FIG. 11

1102

```
private int appliCheck(char data[ ])
{
1102a {
    String readDataOrg = String.valueOf(data);
    String splitReadData[ ];
    StringTokenizer st2 = new StringTokenizer(readDataOrg, ",");
    splitReadData = new String[st2.countTokens()];
    for (int i = 0; st2.hasMoreTokens(); i++) {
        splitReadData[i] = st2.nextToken();
    }

    int result_num = 0;
    try {
1102b {
        ClassLoader loader = URLClassLoader.newInstance(new URL[ ]{new
        File("./../" + splitReadData[0]).toURI().toURL()});
        Class clazz = loader.loadClass(splitReadData[1]);
        Object obj = clazz.newInstance();
    }

    int start_function_num = 0;
    int end_function_num = 0;
    boolean start_method_flag = false;
    boolean end_method_flag = false;

    for (int i = 2; i < splitReadData.length; i++) {
                    if (splitReadData[i].equals("##START_METHOD##"))         1102d
    {
                            start_function_num = i + 1;
                            start_method_flag = true;
                    } else          if
    (splitReadData[i].equals("##END_METHOD##")) {
                            end_function_num = i;
                            end_method_flag = true;
                    }
                    if (start_method_flag = = true && end_method_flag = =
1102c { true) {
                    1103 — result_num = call_function(clazz, obj,
    splitReadData, start_function_num, end_function_num);
                            if (result_num != 0) {
                                    return result_num;
                            }
                            start_method_flag = end_method_flag =
    false;
                    }
            }
    } catch (MalformedURLException e) {                                      1102e
            //ERROR PROCESSING CONTINUES HEREAFTER
            ...
            return 1;
1102f {
    }
    //catch STATEMENT CORRESPONDING TO ERROR CONTINUES HEREAFTER
            ...
            return result_num;
}
```

FIG. 13

EXAMPLE OF PROCESSING RESPONSE OF REQUEST PROCESSING UNIT APPLICATION(3/4)

↓FROM FIG. 12

1103

1103a

1103b

```
        private static int call_function(Class clazz, Object obj, String[ ] splitReadData, int
start_function_num, int end_function_num)
        {
                try {
                        Method[ ] methods = clazz.getMethods();
                        Method method = null;
                        for (int i = 0; i < methods.length; i++) {

        if(methods[i].getName().equals(splitReadData[start_function_num])){
                                        method = methods[i];
                                }
                        }
                        if (method = = null) {
                                return 10;
                        }

                        Class[ ] types = method.getParameterTypes();
                        int length = types.length;
                        for (int i = 0; i < length; i++) {
                                if (types[i].getName() = = "int") {
                                        types[i] = Integer.class;
                                }
                                else if (types[i].getName() = = "short") {
                                        types[i] = Short.class;
                                }
                                //OTHER PRIMITIVE TYPE PROCESSING CONTINUES
                                HEREAFTER
                                ...
                        }
                        Method[ ] valueOfMethods        = new Method[length];
                        for ( int i = 0; i < length; i++) {
                                if (types[i].getName().equals("java.lang.String")) {
                                        valueOfMethods[i] = types[i].getMethod("valueOf",
new Class[ ]{Object.class});
                                }
                                else if (types[i].getName() == "java.lang.Integer") {
                                        valueOfMethods[i] = types[i].getMethod("valueOf",
new Class[ ]{String.class});
                                }
                                //OTHER PRIMITIVE TYPE PROCESSING CONTINUES
                                HEREAFTER
                                ...

                        }
```

EXAMPLE OF PROCESSING RESPONSE OF REQUEST PROCESSING UNIT APPLICATION(4/4)

↓FROM FIG. 13

1103

1103c
```
            String params[ ] = new String[end_function_num -  (start_function_num + 1)];
            for (int i = (start_function_num + 1), j = 0; i < end_function_num; i++, j++) {
                params[j] = splitReadData[i];
            }
```

1103d
```
            switch (length) {
                case 0:
                    method.invoke(obj, null);
                    break;
                case 1:
                    method.invoke(obj,          new          Object[ ]
{valueOfMethods[0].invoke(null, new Object[ ]{params[0]})});
                    break;
                case 2:
                    method.invoke(obj,          new          Object[ ]
{valueOfMethods[0].invoke(null, new Object[ ]{params[0]}),
                                valueOfMethods[1].invoke(null,
new Object[ ]{params[1]})});
                    break;
                //PROCESSING FOR WHEN PARAMETER NUMBER HAS INCREASED
                CONTINUES HEREAFTER
                ...
            }
```

1103e
```
        } catch (IllegalAccessException e) {
            //ERROR PROCESSING CONTINUES HEREAFTER
            ...

            return 4;
        }
        //catch STATEMENT CORRESPONDING TO ERROR CONTINUES HEREAFTER
        ...

        return 0;
    }
}
```

```
var api = (function() {
        function api() {
801a            this.copies = new Array("CopyAppli/copy_sample.jar","copy.CopyJob");
                this.copiesNum = 1;
801b            this.copiesSize = "A4";
                //CONTROL TARGET APPLICATION VARIABLES CONTINUE HEREAFTER        801
                ...
801c            this.returnString = "null";
                this.appliInfo= new Array("Copy_Srevice", "1.0.2", "2.2.1");
        }                                                        1700
        api.prototype.setCopiesNum = function(num) {
                this.copiesNum = num;
        }
        api.prototype.setCopiesSize = function(size) {
                this.copiesSize = size;
        }
        //CONTROL TARGET APPLICATION VARIABLE STORAGE
        FUNCTION CONTINUES HEREAFTER
        ...                                                      802
        api.prototype.getCopiesNum = function() {
                return this.copiesNum;
        }
        api.prototype.getCopiesSize = function() {
                return this.copiesSize;
        }
        //CONTROL TARGET APPLICATION VARIABLE OBTAINMENT
        FUNCTION CONTINUES HEREAFTER
        ...
        api.prototype.startApplication = function() {
                copies.push("##START_METHOD##", "setNumberOfCopies", this.copiesNum,
803a "##END_METHOD##");
                copies.push("##START_METHOD##", "startCopy", null, "##END_METHOD##");   803
                //FUNCTION SETTINGS REQUIRED TO EXECUTE CONTROL TARGET
                APPLICATION CONTINUE HEREAFTER
                ...
803b            startAppli (copies);
        }
804a    api.prototype.returnAppli = function(str) {
                this.returnString = str;
        }                                                        804
804b    api.prototype.getReturnAppli = function() {
                return this.returnString;
        }
        api.prototype.checkAppliInfo = function() {
                checkInfo(appliInfo);                            1701
        }
                1702
        return api;
})();
```

```
import java.net.*;
import java.util.StringTokenizer;
import org.osgi.framework.*;

public class CommunicationActivator implements BundleActivator {

        private BundleContext bundleContext;

        public void start(BundleContext bundleContext)
        {
                this.bundleContext = bundleContext;
                //BUNDLE START PROCESSING CONTINUES HEREAFTER
                ...

        }

        private int versionCheck(char data[ ])
        {
                String readDataOrg = String.valueOf(data);
                String splitReadData[ ];
                StringTokenizer st2 = new StringTokenizer(readDataOrg, ",");
                splitReadData = new String[st2.countTokens()];
                for (int i = 0; st2.hasMoreTokens(); i++) {
                        splitReadData[i] = st2.nextToken();
                }

                Bundle bundles[ ] = this.bundleContext.getBundles();

                for (int i = 0; i < bundles.length; i++) {
                        if (bundles[i].getHeaders().get("Bundle-Name").equals(splitReadData[0])) {
                                String appliVersion =
bundles[i].getHeaders().get("Bundle-Version").toString();
                                if (appliVersion.compareTo(splitReadData[1]) > 0 &&
appliVersion.compareTo(splitReadData[2]) < 0) {
                                        return 0;
                                } else {
                                        return 30;
                                }
                        }
                }
                return 20;
        }

}
```

1801

1102a

1802a

1802c

1802d

1802b

1802

F I G. 19A
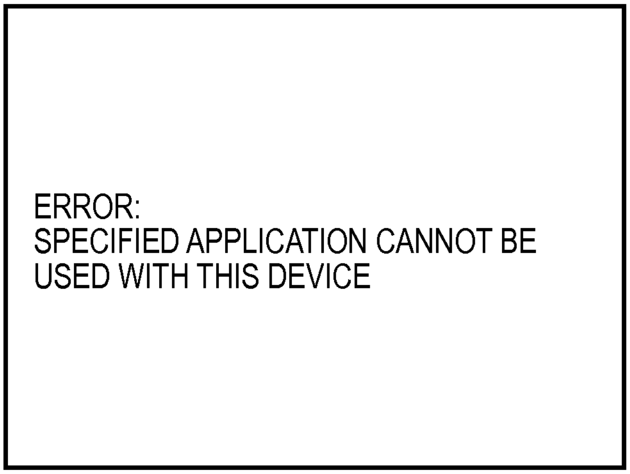
F I G. 19B
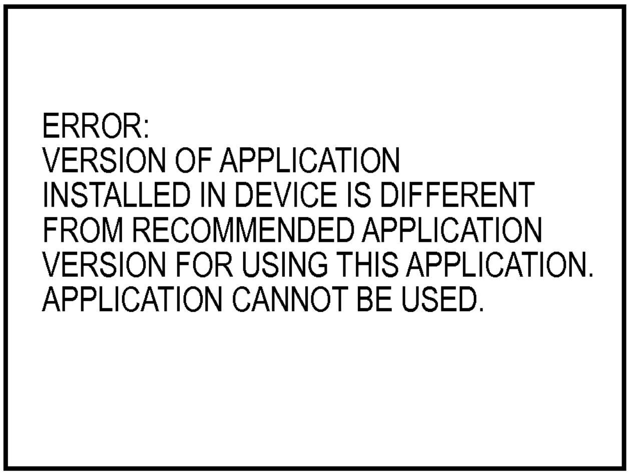

IMAGE PROCESSING APPARATUS, NON-TRANSITORY STORAGE MEDIA AND CONTROL METHOD THEREOF FOR GENERATING OPERATION SCREEN TO UTILIZE VARIOUS APPLICATIONS FOR EXECUTING IMAGE PROCESSING FUNCTIONS

BACKGROUND OF THE INVENTION

Field of the Invention

The present invention relates to image processing apparatuses, control methods thereof, and storage media that store programs.

Description of the Related Art

Image processing apparatuses in which the functions of various devices such as scanners and printers, facsimile and communication devices, and so on are provided within a single unit have been known for some time. This type of image processing apparatus has an application platform environment in which various types of processes for the scanner, printer, or the like are run on an application-by-application basis, and a web browser is used to display a console. By manipulating screens displayed in the web browser, a user can utilize the various types of functions of the image processing apparatus via the applications run on the application platform.

The method disclosed in Japanese Patent Laid-Open No. 2012-105071 can be given as an example of a format in which the various types of functions and applications of the image processing apparatus are used through an operating screen displayed in a web browser. According to Japanese Patent Laid-Open No. 2012-105071, first, the web browser displays an operating screen in a console of the image processing apparatus based on screen information received over a network from an external apparatus. When the user operates the operating screen, the web browser sends details of the user operation to the external apparatus over the network. The web browser then receives a request according to the SOAP (Simple Object Access Protocol) communication protocol as a response to the sent details. The web browser transfers the received request to a web service provider application, and a function of the image processing apparatus provided by the web service provider is then used.

However, with this conventional technique, the only applications of the image processing apparatus that can be operated through the web browser are web browser-based applications compliant with a predetermined protocol. Local applications that can be operated through the operating screen of the image processing apparatus are generally not capable of being operated through the web browser. As such, in order to operate a local application through the web browser, it has been necessary to add modifications based on the specifications of the predetermined protocol and recreate the application as a web browser-based application.

SUMMARY OF THE INVENTION

An aspect of the present invention is to eliminate the above-mentioned problems with the conventional technology.

The present invention provides a system that reduces the number of steps required to develop a program as a web browser-based program, without requiring an application to be modified so that the application can be operated through a web browser.

The present invention in one aspect provides an image processing apparatus having a web browser, the apparatus comprising: an application that executes a function of the image processing apparatus; and a control unit configured to, upon receiving a control request from the web browser, execute a corresponding application by loading a class of the corresponding application and calling an execution function.

According to the present invention, the number of steps required to develop a program as a web browser-based program can be reduced without requiring an application to be modified so that the application can be used through a web browser.

Further features of the present invention will become apparent from the following description of exemplary embodiments (with reference to the attached drawings).

BRIEF DESCRIPTION OF THE DRAWINGS

FIGS. 5A and 5B are sequence charts illustrating a flow of processes performed by the image processing apparatus.

FIG. 6 is a diagram illustrating an operating screen of a web application displayed in the display unit of the image processing apparatus.

FIG. 7 is a diagram illustrating HTML data received by the image processing apparatus from the external apparatus in S603 of FIGS. 5A and 5B.

FIG. 8 is a diagram illustrating a JavaScript (registered trademark) library of the image processing apparatus.

FIGS. 9 and 10 are diagrams illustrating programs that execute a response process for a request transfer unit of the image processing apparatus.

FIGS. 11, 12, 13, and 14 are diagrams illustrating programs that execute a response process for a request processing unit application of the image processing apparatus.

FIG. 17 is a diagram illustrating a JavaScript library of the image processing apparatus.

FIG. 18 is a diagram illustrating a program implemented by a determination unit.

FIGS. 19A and 19B are diagrams illustrating error screens displayed by an image forming apparatus.

DESCRIPTION OF THE EMBODIMENTS

Figure 1:
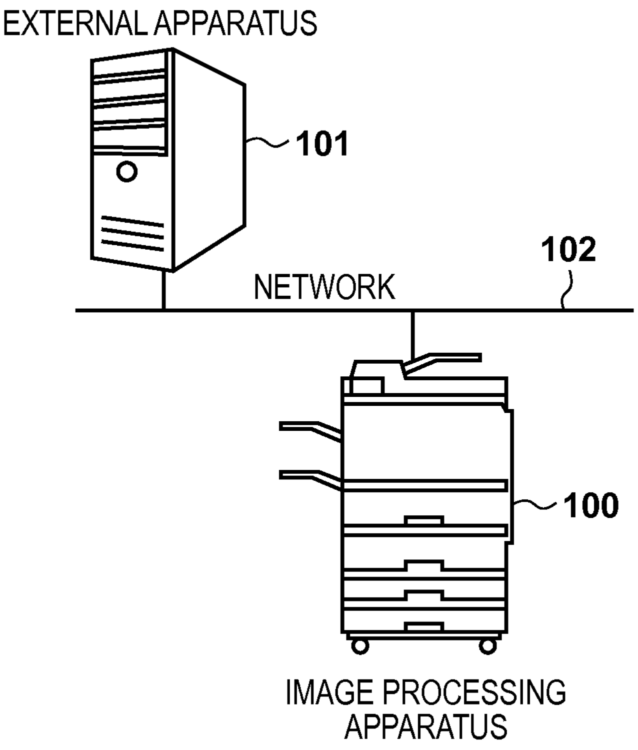
FIG. 1 is a diagram illustrating the overall configuration of an information processing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

FIG. 1 is a diagram illustrating an example of the overall configuration of an information processing system according to a first embodiment of the present invention.

In this system, an image processing apparatus 100 and an external apparatus 101 are connected by a network 102. The image processing apparatus 100 is an apparatus having various types of image processing functions such as an image forming function, an image reading function, an image transmitting function, as well as a web browser function for carrying out HTTP (Hyper Text Transfer Protocol) communication over a network. The image processing apparatus 100 may be a printer, a copier, a fax device, a scanner, or an MFP (Multi Functional Peripheral) that integrates these multiple functions in a single unit. The external apparatus 101 is an information processing apparatus, such as a computer (PC), equipped with a web server function and a web application having a function for providing a GUI (Graphical User Interface), corresponding to screen information, to the image processing apparatus 100.

Figure 2:
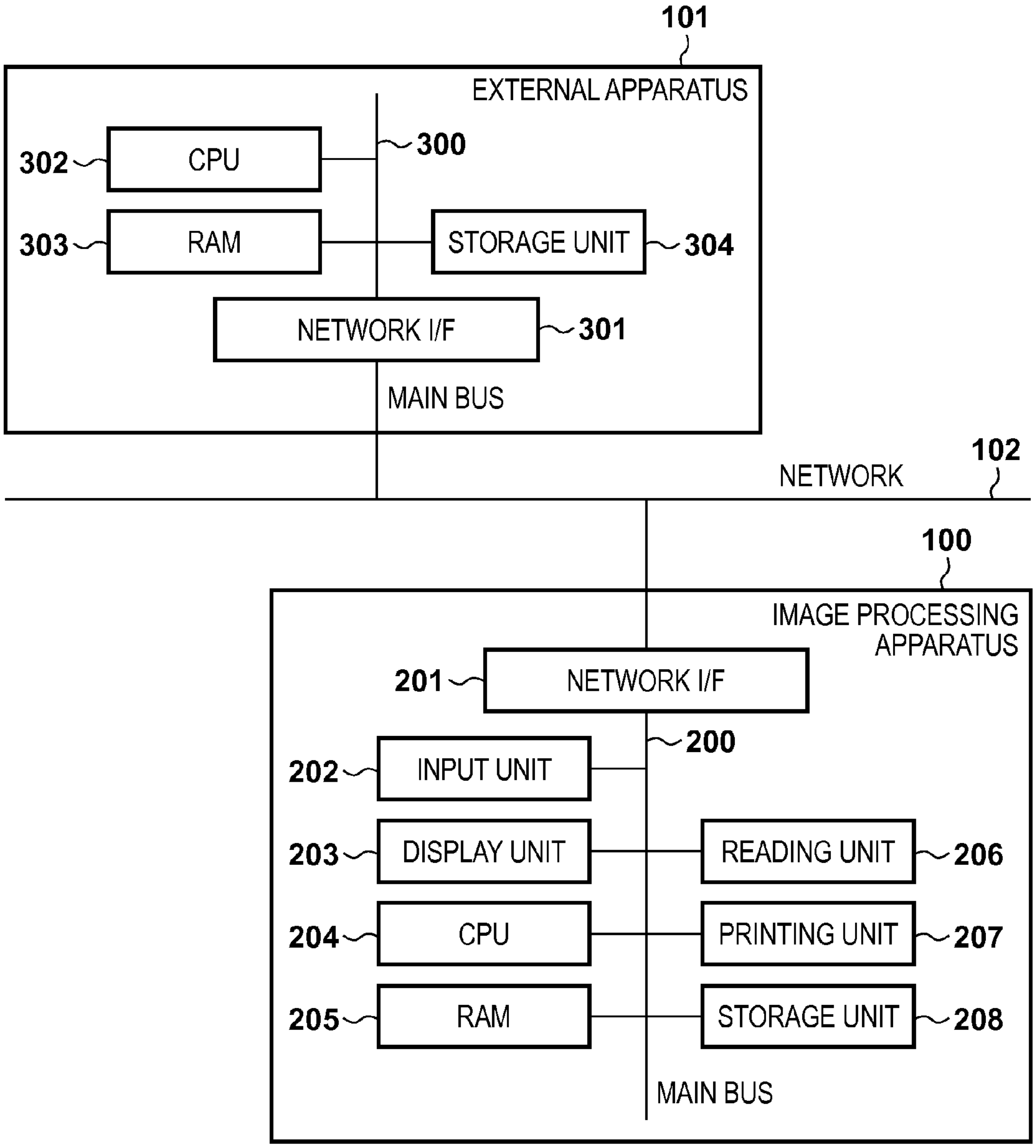
FIG. 2 is a block diagram illustrating the hardware configurations of an external apparatus and an image processing apparatus.

FIG. 2 is a block diagram illustrating an example of the hardware configuration of the external apparatus 101 and the image processing apparatus 100 according to the first embodiment.

The image processing apparatus 100 includes a network I/F 201 for carrying out network communication with the external apparatus 101 and the like, an input unit 202 (a keyboard or the like) that accepts user operations, and a display unit 203 that displays an operating screen.

Furthermore, the image processing apparatus 100 includes a CPU 204 that controls the apparatus as a whole, a RAM 205 that provides a work area for the CPU 204, a reading unit 206 that reads a document, a printing unit 207 that prints image data, and a storage unit 208 that stores various types of control programs and the like. These units of the image processing apparatus 100 are connected to the CPU 204 via a main bus 200, and are capable of exchanging data with one another. Although the input unit 202 and the display unit 203 are indicated as being separate units in FIG. 2, it should be noted that these units may be integrated into a single console.

The external apparatus 101 includes a network I/F 301 that carries out network communication with the image processing apparatus 100, a CPU 302 that controls the apparatus as a whole, a RAM 303 that provides a work area for the CPU 302, and a storage unit 304 that stores various types of control programs and the like. These units of the external apparatus 101 are connected via a main bus 300, and are capable of exchanging data with one another.

Figure 3:
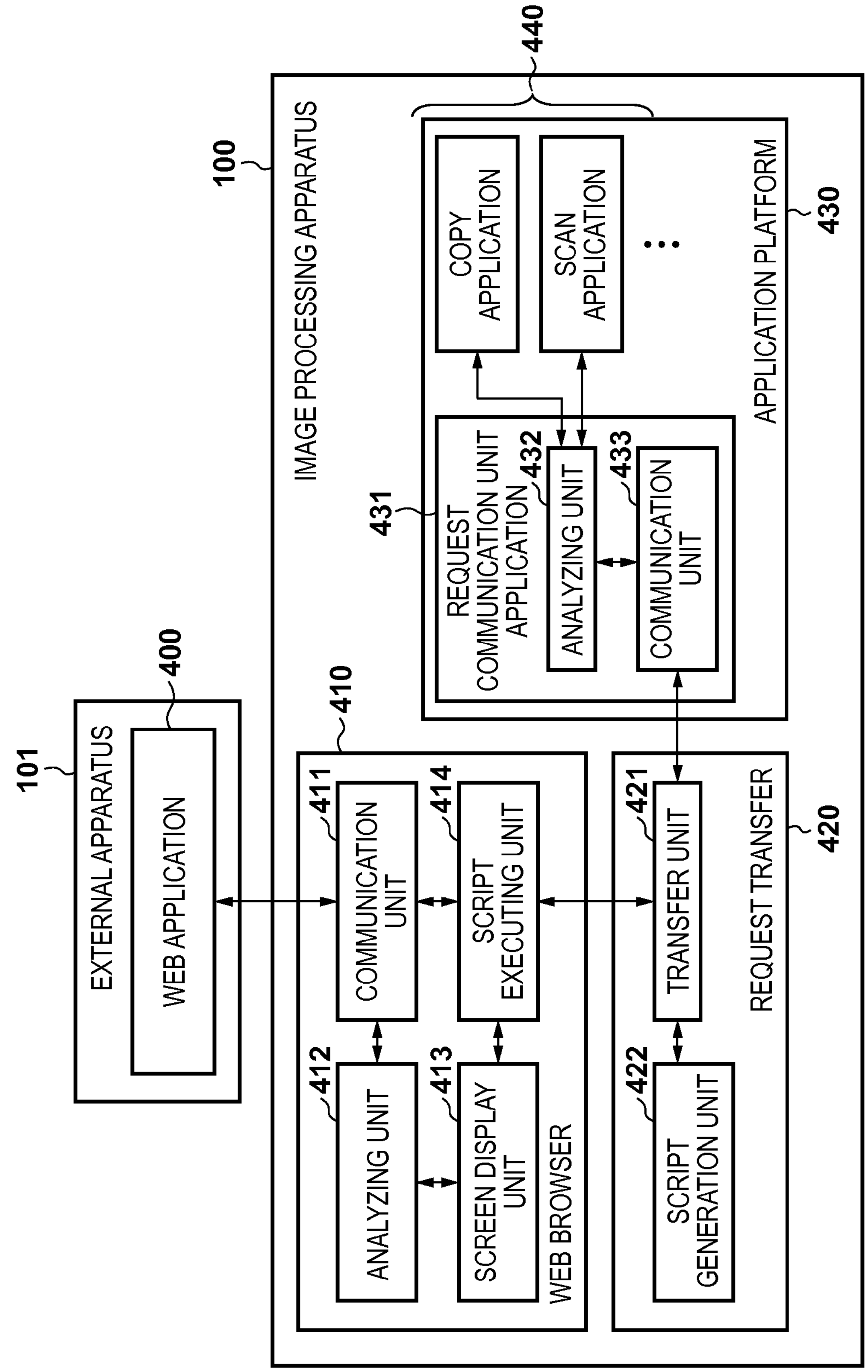
FIG. 3 is a functional block diagram illustrating the software configuration of the external apparatus and the image processing apparatus.

FIG. 3 is a functional block diagram illustrating the software configuration of the external apparatus 101 and the image processing apparatus 100 according to the first embodiment.

First, software of the external apparatus 101 will be described.

The external apparatus 101 includes a web application 400. The web application 400 is stored in the storage unit 304 and is sent to the image processing apparatus 100 via the network I/F 301.

The web application 400 has a function for displaying, in the display unit 203 of the image processing apparatus 100, an operating screen for operating the image processing apparatus 100 via a web browser 410. The web application 400 also has a function for controlling actions taken by the image processing apparatus 100 in response to user operations made through the operating screen. To realize the stated functions, the web application 400 has HTML (Hypertext Markup Language) as data written in a markup language as well as data written in a script language. A predetermined JavaScript library for controlling the functions of the image processing apparatus 100, described later, is included in the script language. The configuration for realizing the web application 400 is not limited as long as the predetermined JavaScript library is provided.

Next, software of the image processing apparatus 100 will be described.

The image processing apparatus 100 has the web browser 410, a request transfer unit 420, and an application platform 430. The functions of these units are stored in the storage unit 208 of the image processing apparatus 100 as programs, which are then executed by the CPU 204. The web browser 410 has a communication unit 411, an analysis unit 412, a screen display unit 413, and a script executing unit 414. The communication unit 411 obtains a web application provided by the external apparatus 101 through HTTP communication via the network I/F 201. The analysis unit 412 analyzes the HTML data that constitutes the obtained web application 400. The screen display unit 413 displays screens using the data analyzed by the analysis unit 412. The script executing unit 414 executes control defined by the scripts that constitute the obtained web application 400, and controls screen transitions and the like of the screen display unit 413. The script executing unit 414 executes a predetermined JavaScript function, which will be described later, that is provided in the script that constitutes the obtained web application 400. The script executing unit 414 also executes JavaScript code obtained from the request transfer unit 420, and carries out control for transitioning between screens of the screen display unit 413.

The request transfer unit 420 controls requests for control and the exchange of JavaScript code between the web browser 410 and the application platform 430. The request transfer unit 420 has a transfer unit 421 and a script generating unit 422. The transfer unit 421 has a callback function as a control function corresponding to the calling of a predetermined JavaScript function, which will be described later. When the predetermined JavaScript function is executed by the script executing unit 414, the callback function of the transfer unit 421, which is associated with that JavaScript, is called. As a result, the transfer unit 421 transfers, to the application platform 430, the argument of the callback function sent from the script executing unit 414 as a control request. Note that this argument specifies parameters necessary for executing applications of the image processing apparatus 100. The transfer unit 421 also receives, from the application platform 430, a result of executing a control request for a function of the image processing apparatus 100, and transfers that execution result to the script generating unit 422. The script generating unit 422 accepts the result of executing the control request for the function of the image processing apparatus 100 from the transfer unit 421, generates JavaScript code that can be executed by the script executing unit 414, and sends that code to the transfer unit 421. The transfer unit 421 sends the JavaScript code accepted from the script generating unit 422 to the script executing unit 414.

The application platform 430 is an execution platform on which an application that controls the image processing apparatus 100 via a control API (Application Program Interface) can be executed. In this embodiment, the application platform 430 is a Java virtual machine capable of executing Java (registered trademark) applications.

The application platform 430 includes a control target application 440 as an application that uses the hardware resources of the image processing apparatus 100 (the reading unit 206, the printing unit 207, and so on) through the control API. The control target application 440 is a copy application, a scan application, or the like, for example. The application platform 430 also includes a request communication unit application 431 having a function for executing the control target application 440 in accordance with a control request from the web browser 410. The request communication unit application 431 has an analyzing unit 432 and a communication unit 433. The communication unit 433 receives a control request for the control target application 440, sent from the transfer unit 421. The communication unit 433 also sends, to the transfer unit 421, a result of the control target application 440 executing a function of the image processing apparatus 100, sent from the analyzing unit 432. The analyzing unit 432 analyzes the control request received from the communication unit 433, loads the class of the specified control target application 440, and calls a control execution function, thus controlling actions of the image processing apparatus 100. Note that the configuration of the application platform 430 is not limited as long as the application platform 430 has a configuration in which the analyzing unit 432 of the request communication unit application 431 is provided with a "configuration in which the class loaded during application execution, the execution function, and so on can be changed dynamically", which will be described later.

Figure 4:
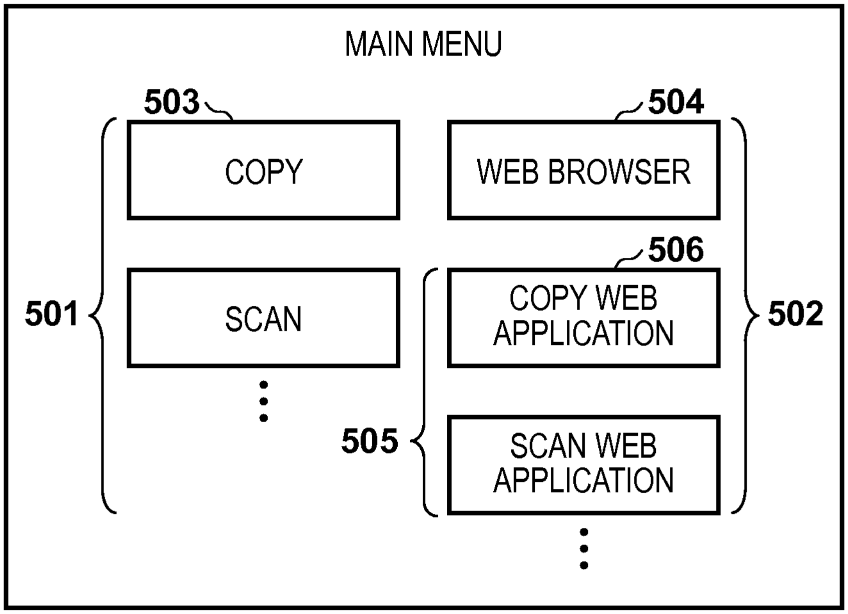
FIG. 4 is a diagram illustrating a main menu screen displayed in a display unit of the image processing apparatus.

FIG. 4 is a diagram illustrating an example of a main menu screen displayed in the display unit 203 of the image processing apparatus 100 according to the present first embodiment.

This main menu screen is the first screen that is displayed when the image processing apparatus 100 is turned on, and has application launch buttons 501 and 502 for providing functions of the image processing apparatus 100 via the control target application 440 illustrated in FIG. 3.

The application launch button 501 is a button that directly launches the control target application 440. Actions taken when a copy button 503 that executes the copy application of the control target application 440 is pressed will be described as an example. When the copy button 503 is pressed by a user, the CPU 204 of the image processing apparatus 100 launches the copy application of the control target application 440. At this time, the user specifies the copy application to be executed via the operating screen of the copy application, which is displayed in the display unit 203.

The application launch button 502 is a button that switches to a screen display of the web browser 410. In the present embodiment, the main menu screen has a button 504 that launches the web browser 410 and a shortcut button 505 that launches the web browser 410 and accesses a URL address the user has caused the CPU 204 to store in advance.

This specific example describes actions taken when a copy web application button 506, which is a shortcut button that executes the copy application of the control target application 440 from the web browser 410, has been pressed. The copy web application button 506 is a button in which a URL of an application that carries out operations for executing the copy function through a process that will be described later has been stored by the CPU 204. When the user presses the copy web application button 506, the CPU 204 obtains the copy web application from the URL address stored in association with that button and displays the application through the web browser 410. Next, the user specifies the copy application to be executed by carrying out an operation via a display screen of the web application displayed in the display unit 203. Upon receiving a control request for execution, the CPU 204 executes the copy application via the request transfer unit 420 and the request communication unit application 431. Note that the processing following thereafter is assumed to be an operation in which the user presses the copy web application button 506 and operates the copy application of the control target application 440 via the web browser 410.

FIGS. 5A and 5B are sequence charts illustrating a flow of processes performed by the image processing apparatus 100 according to the present first embodiment. Actions performed by the image processing apparatus 100 according to the first embodiment will be described hereinafter with reference to this sequence chart. Furthermore, details of processes performed by the image processing apparatus 100 will be described with reference to configuration data (see FIGS. 7 to 14) that constitutes the respective processes. Each step S in FIGS. 5A and 5B is executed by the CPU 204 of the image processing apparatus 100 reading out programs stored in the storage unit 208 into the RAM 205 and executing those programs. The first embodiment assumes that the control target application 440 is an application created using a control API for executing a copy function of the image processing apparatus 100. Furthermore, the web application 400 is assumed to be an application that carries out operations for executing the copy function of the image processing apparatus 100 via the control target application 440. Further still, in FIGS. 5A and 5B, the same reference numerals are given to elements that are the same as in the aforementioned software configuration illustrated in FIG. 3, and descriptions thereof will be omitted. First, the flow of a series of processes from S602 to S605 in FIGS. 5A and 5B will be described.

When a user 600 uses the input unit 202 to press a button (not shown) that launches the web application 400 in S601, the CPU 204 executes a program, stored in the storage unit 208, that launches the web browser 410, in S602. In this manner, after the web browser 410 is launched, the CPU 204 sends an HTTP Request from the communication unit 411 to the external apparatus 101 over the network I/F 201 based on the URL indicating the storage location of the web application 400 stored in the storage unit 208.

As a result, the CPU 302 of the external apparatus 101 receives the HTTP Request via the network I/F 301. Then, in S603, the CPU 302 sends an HTTP Response, in which is included data (HTML, JavaScript, or the like) that constitutes the web application 400, from the storage unit 304 to the image processing apparatus 100 via the network I/F 301.

Then, in S604, the CPU 204 of the image processing apparatus 100 uses the analysis unit 412 to analyze the data received by the communication unit 411 via the network I/F 201. Then, in S605, the CPU 204 displays an operating screen in the display unit 203 through the screen display unit 413.

FIG. 6 is a diagram illustrating an example of the operating screen of the web application 400 analyzed by the CPU 204 and displayed in the display unit 203 through the screen display unit 413 in S604 and S605 of FIGS. 5A and 5B.

In the first embodiment, this screen is an operating screen for executing the copy function of the image processing apparatus 100 via the copy application, which is an example of the control target application 440. As indicated in FIG. 6, an operating screen 660 has settings buttons 661 for setting a number of sheets to be printed, a document size, and so on, and an execute button 662 for starting to execute the function of the control target application 440. The foregoing has been a description of the series of processes from S602 to S605 in FIGS. 5A and 5B.

In the present first embodiment, a URL of the external apparatus 101 that stores the web application 400 is stored in the storage unit 208 in advance when the web browser 410 is launched; however, it should be noted that the present invention is not limited thereto. For example, the CPU 204 may launch the web browser 410 from the storage unit 208 when the user 600 presses a launch button in the input unit 202. Then, the CPU 204 may send, from the communication unit 411 via the network I/F 201, an HTTP Request based on the URL of the external apparatus 101 that stores the web application 400 specified by the user 600 through the input unit 202.

Next, the flow of processes performed in S610, S611, S620, and S621 in FIGS. 5A and 5B will be described.

In S610, the user 600 uses the input unit 202 to press the settings buttons 661 in the operating screen 660. As a result, the CPU 204 executes, via the script executing unit 414, a script portion (code 702*b* in FIG. 7) that dynamically executes control, such as screen transitions and the like, corresponding to the manipulation of the settings buttons 661. Then, in S611, the CPU 204 creates a control request for the control target application 440 while dynamically causing the screen display unit 413 to carry out such transitions.

Next, in S620, the user 600 uses the input unit 202 to press the execute button 662 in the operating screen 660. As a result, the CPU 204 executes, via the script executing unit 414, a script portion (code 702*c*) for causing the execution of the control target application 440 corresponding to the execute button 662. By executing the script portion (the code 702*c*), in S621, the CPU 204 sends the control request created through the aforementioned S610 and S611 to the transfer unit 421 of the request transfer unit 420.

FIGS. 7 and 8 indicate examples of script data that carry out operating screen transitions, start the execution of the function of the control target application 440, and so on, which are executed in S610, S611, S620, and S621 of FIGS. 5A and 5B.

FIG. 7 is a diagram illustrating an example of HTML data received from the external apparatus 101 in S603 of FIGS. 5A and 5B. This HTML data includes a screen format definition portion (code 703) for the operating screen 660. This HTML data also includes a script portion (code 702) that dynamically controls screen transitions and the like, as well as an import portion (code 701) of a JavaScript library 800 provided with classes and functions for executing the control target application 440.

Code 703 includes configurations of the settings buttons 661 for the number of printed sheets, document size, and so on (code 703*a*) and the execute button 662 that starts the execution of the function of the control target application 440 (code 703*b*).

Operational settings for dynamic transitions of operating screens (S611, S621) are realized via the script portion (the code 702*b*) that defines the settings buttons 661 and the script portion (the code 702*c*) that defines the execute button 662. The codes 702*b* and 702*c* also execute the saving of various types of control settings (S611) and the exchange of control requests (S621, S628), and are thus scripts that call a function of the JavaScript library 800 (FIG. 8) included by code 701.

Code 702*a* indicates a script that generates an API instance defined by the JavaScript library 800. Code 702*b* is a script that executes an api.setCopiesSize function, and code 702*c* is a script that executes an api.setCopiesNum function and an api.startApplication function.

The JavaScript library 800 illustrated in FIG. 8 has a constructor portion (code 801), Getter and Setter portions (code 802), a control request sending portion (code 803), and a control result holding portion (code 804). Code 801 is an array (code 801*a*) sent as the control request in S621 and a definition of a group of variables (code 801*b*) corresponding to arguments of an execution function of the control target application 440 that holds the control request generated in S611. As default values, code 801*a* is substituted with a path name of a jar file of the control target application 440 and a name of the class that executes processing. A variable (the code 801*b*) that holds a control result for the control target application 440 during the execution of a script in S629 (mentioned later) is also defined.

Code 802 is a definition of a group of functions that obtain and configure variables for each of the variables in code 801*b*.

Code 803 is a script that sends a created control request for the control target application 440 to the request transfer unit 420, and is executed in S621. The code 803 includes a group of functions (code 803*a*) that stores control settings of the group of variables (code 801*b*) in an array (code 801*a*) and a control start function (code 803*b*) that sends the control request to the request transfer unit 420 as an argument. The code 803*b* defines a function for calling a callback function within the configuration data of the request transfer unit 420, which will be described later.

When a startAppl function in the code 803*b* is executed as a result of the execute button 662 being manipulated, the callback function of the request transfer unit 420 is executed, and the argument (copies) of the function in the code 803*b* is sent to the request transfer unit 420 as the control request.

Through the HTML data and scripts described thus far, the web browser 410 executes the script portion (the code 702*b*) in response to the user 600 manipulating the settings buttons 661 in S610, and as a result, the dynamic transitions of the operating screen, the creation of the control request, and so on of S611 are executed. Furthermore, the web browser 410 executes the script portion (the code 702*c*) in response to the user 600 manipulating the execute button 662 in S620, and as a result, the sending of the control request to the request transfer unit 420 in S621 is executed. The foregoing has been a description of the flow of processes performed in S610, S611, S620, and S621 in FIGS. 5A and 5B.

Next, the flow of processing performed in S622 in FIGS. 5A and 5B will be described.

After executing a predetermined JavaScript function using the script executing unit 414 in the aforementioned S621, the CPU 204 reads out the program of the transfer unit 421 of the request transfer unit 420 into the RAM 205 from the storage unit 208. Then, in S622, the CPU 204 obtains the control request by executing a callback function associated with the execution of the predetermined JavaScript function within the program of the transfer unit 421, and transfers the control request to the communication unit 433 of the request communication unit application 431.

FIGS. 9 and 10 illustrate an example of the program that executes a response process of the request transfer unit 420 used in S622.

Code 900 indicates the overall configuration of the program of the request transfer unit 420, and includes code 901 and code 902. In the present first embodiment, the program of the code 900 is written in C/C++. The code 901 is a declaration for including the functions of the web browser engine WebKit (registered trademark) JavaScriptCore library. The code 901 is used in order to utilize a library that enables the execution of the processes of the request transfer unit 420 from the JavaScript library 800 and the processes of the JavaScript library 800 from the request transfer unit 420 through the web browser 410, and in order to add proprietary APIs.

The code 902 is code for using the functions of the JavaScript library 800. The code 902 includes code 902*a* and code 902*b*. The code 902*a* is the configuration of a callback function called when a predetermined function specified by the JavaScript library 800 (the code 803*b*) is executed. In the present first embodiment, the predetermined function specified by the JavaScript library 800 is assumed to be the startAppli function, and the callback function that is called is assumed to be a JSGlobalStart function (the code 902*b*). The code 902*a* is called only once, when the web browser 410 is launched. At this time, the JSGlobalStart function is associated as a callback function called when the startAppli function of the JavaScript library 800 is executed. Thereafter, the web browser 410 can use the callback function when executing the startAppli function. The code 902*b* is a callback function called when a function specified by the JavaScript library 800 (the code 803*b*) is executed. The code 902*b* includes a JavaScript character string conversion portion (code 902*c*), a transfer to the request communication unit application 431 (code 902*d*), a script generating portion (code 902*e*), and a transfer to the web browser 410 (code 902*f*). In the case where an argument is present in the function specified by the JavaScript library 800 (the code 803*b*), the code 902*b* is executed with that argument having been obtained. In the first embodiment, when the startAppli function is executed in S621, the control request for the control target application 440 is obtained as an argument (the code 803*b*), and thus the control request is sent to the code 902*b*.

Because the control request passed to the callback function is in the JavaScript code format, the code 902*c* converts the control request into a C/C++ character string. The code 902*c* is realized by a function of the JavaScript library 800.

In the present embodiment, a JavaScript array of the control request ["CopyAppli/copy_sample.jar", "copy.CopyJob", . . . ] is converted into the character string "CopyAppli/copy_sample.jar,copy.CopyJob, . . . ".

The code 902*d* transfers the character string of the control request to the request communication unit application 431 as a process corresponding to S622. Although the first embodiment describes a configuration in which the character string of the control request is sent using socket communication, the configuration is not particularly limited as long as the configuration enables the control request to be exchanged between the request transfer unit 420 and the request communication unit application 431.

Through the program described thus far, when the web browser 410 executes the startAppli function in S621, the request transfer unit 420 executes the JSGlobalStart function (the code 902*b*) associated with that function. Then, the request transfer unit 420 transfers the control request to the request communication unit application 431 in S622, within that function.

In the present first embodiment, the JavaScript library 800 is used and thus the request transfer unit 420 is written in C/C++, but the configuration thereof is not particularly limited as long as a library that enables proprietary APIs that can be mutually executed to be added to the JavaScript is provided.

The foregoing has been a description of the flow of processes performed in S622 in FIGS. 5A and 5B.

Next, the flow of a series of processes from S623 to S626 in FIGS. 5A and 5B will be described.

Using the communication unit 433 of the request communication unit application 431, the CPU 204 receives the control request sent by the transfer unit 421 in the aforementioned S622. Next, in S623, the CPU 204 analyzes the control request using the analyzing unit 432, and in S624 and S625, executes the control target application 440 corresponding to the analyzed control request. Then, in S626, the CPU 204 uses the communication unit 433 to send the result of executing the control target application 440 received from the analyzing unit 432 to the transfer unit 421.

FIGS. 11 to 14 illustrate an example of a program, used from the aforementioned S623 to S626, that realizes a processing response of the request communication unit application 431.

Code 1100 indicates the overall configuration of the program of the request communication unit application 431, and includes code 1101, code 1102 (FIG. 12), and code 1103 (FIGS. 13 and 14). In the present first embodiment, the program of the code 1100 is written in Java.

The code 1101 executes the series of processes from S623 to S626. Code 1101*a* receives the control request sent from the request transfer unit 420 in the aforementioned S622. The code 1102 executes a function for analyzing the control request and executing the control target application 440, corresponding to S623, S624, and S625. Code 1101*b* sends, to the request transfer unit 420, a result of the code 1102 executing the control target application 440, which corresponds to S626.

Although the present first embodiment describes a configuration in which socket communication is used to receive the control request and send the execution result, it should be noted that the configuration is not limited as long as the configuration enables control requests to be exchanged between the programs that constitute the request transfer unit 420 and the request communication unit application 431.

The code 1102 includes a portion for analyzing the received control request, corresponding to S623, and a portion for executing the control request, corresponding to S624 and S625. The code 1102*a* divides the control request character string received from the request transfer unit 420 into individual character strings and stores the character strings in a character array used for analysis. In the present first embodiment, the control request character string "CopyAppli/copy_sample,copy.CopyJob, . . . " converted by the request transfer unit 420 through the code 902*c* is divided at the "," and is stored in the array as individual character strings "CopyAppli/copy_sample", "copy.CopyJob", and so on.

Based on the divided control request character strings, the code 1102*b* dynamically generates instances of classes provided with control APIs that execute predetermined functions of the image processing apparatus 100 using the control target application 440.

In the present first embodiment, a class provided with a control API is loaded from the path of a jar file provided first in the character array by the code 1102*a*. An instance is generated dynamically from a class name provided second in the character array. In the subsequent processing, the request communication unit application 431 can call the control API of the control target application 440 through the aforementioned instance.

Code 1102*c* is constituted by code 1102*d*, code 1102*e*, and the code 1103. The code 1102*d* analyzes the content of the character array provided by the code 1102*a*, and specifies a range of an array that holds a function name and an argument of the control API executed by the control target application 440.

In the present first embodiment, the character string present between "##START_METHOD##" and "##END_METHOD##" in the character array has a function name and an argument, and provides an array number of that range.

The code 1102*e* calls (S624, S625) a processing function (the code 1103) that executes the control API of the control target application 440 and takes the control request, the created class instance (the code 1102*b*), and the analyzed array number (the code 1102*d*) as arguments. Note that the code 1102*c* repeatedly executes the processing until all of the received control requests are executed or until a result of executing the processing function (the code 1103) is an abnormal termination.

Code 1102*f* carries out a process for suspending processing and returning an abnormal termination as a return value in the case where an exception has occurred during the processing of the code 1102. In S626, this processing result is sent along with the result of executing the function of the code 1103 (S625) to the request transfer unit 420 as an execution result.

The code 1103 executes the function of the control API of the control target application 440 specified as the control request, corresponding to S624 and S625. Code 1103*a* determines whether a function name of the control API of the control target application 440 specified as the control request is present in the class dynamically generated by the code 1102*b*, returning an error and ending the processing in the case where the function name is not present. Code 1103*b* provides, in the array, a type group of the arguments in the function of the control API of the control target application 440 specified as the control request. Code 1103*c* provides, in the array, an argument that is passed when executing the function of the control API of the control target application 440 specified as the control request, received as a control request. Code 1103*d* executes the function of the control API of the control target application 440 specified as the control request using the arrays provided by the code 1103*b* and the code 1103*c*. Through these processes, the request communication unit application 431 executes the functions of the image processing apparatus 100 via the control API of the control target application 440, based on the class name, the function name, and the variables. As a process corresponding to S625 in FIGS. 5A and 5B, code 1103*e* suspends processing and returns an abnormal termination as a return value in the case where an exception has occurred during the processing of the code 1103, and passes a normal termination result to the code 1102 when an exception has not occurred.

Through the program described above, the control request received by the request communication unit application 431 is analyzed in S623, the specified control target application 440 is executed in S624 and S625, and the execution result is transferred to the request transfer unit 420 in S625.

The foregoing has been a description of the series of processes from S623 to S626 in FIGS. 5A and 5B.

Next, the flow of processes performed in S627 and S628 in FIGS. 5A and 5B will be described.

In S626, the CPU 204 receives the result of executing the control target application 440 sent from the communication unit 433 by the transfer unit 421, and in S627, executes the program of the script generating unit 422 and creates JavaScript code based on a result of the execution. Thereafter, in S628, the CPU 204 uses the transfer unit 421 to send, to the script executing unit 414 of the web browser 410, the JavaScript code generated by the script generating unit 422.

An example of a program that constitutes the corresponding processing response of the request transfer unit 420, used in S627 and S628 of FIGS. 5A and 5B, is indicated by code 902*e* to code 902*h* in FIG. 10.

The code 902*e* has a configuration that receives a character string resulting from executing the control target application 440 from the request communication unit application 431, as a process corresponding to S626. Although the present first embodiment describes using socket communication as a configuration for receiving the execution result character string, it should be noted that the configuration is not limited as long as the configuration enables control requests to be exchanged between the programs that constitute the request transfer unit 420 and the request communication unit application 431.

Based on the received result of executing the control target application 440, the code 902*f* creates a C/C++ character string expressing JavaScript code that reflects the execution result, as a process corresponding to S627. At this time, the created JavaScript code character string includes a predetermined JavaScript function defined by the JavaScript library 800. In the present first embodiment, this predetermined JavaScript function defines a function returnAppli that receives a character string of the execution result within the JavaScript library 800 (code 804*a*). In addition, in the code 902*f*, the created JavaScript code character string executes the returnAppli function in which the execution result character string is taken as an argument. Code 902*g* converts the created JavaScript code C/C++ character string into JavaScript code that can be executed as JavaScript. This code 902*g* is realized using functions of the JavaScriptCore library. The code 902*h* transfers the execution result to the web browser 410 as a result of calling a function of the script executing unit 414 that takes the converted JavaScript code as an argument, as a process corresponding to S628. This code 902*h* is realized using functions of the JavaScriptCore library.

In the present first embodiment, the functions of the JavaScriptCore library that constitutes the script executing unit 414 calls the JavaScript code created in S627 as an argument for the function that executes the JavaScript code in the argument.

Through this process, the JavaScript code in the argument is executed by the script executing unit 414 of the web browser 410 as a function (the code 804*a*) in which the returnAppli function written therein has the execution result character string as an argument. In other words, the transfer of the execution result from the request transfer unit 420 to the web browser 410, which corresponds to S628, is carried out through the processing of the code 902*h*.

Although the present first embodiment uses the JavaScriptCore library in S627 and S628, the configuration is not limited thereto. Any configuration may be employed as long as a library capable of executing a character string as JavaScript code is provided and that library is used in an execution program (not shown) of the script executing unit 414.

Through the aforementioned program, the request transfer unit 420 transfers the execution result by generating a script from the received result of executing the control target application 440 in S627 and sending that script to the web browser 410 in S628.

The foregoing has been a description of the flow of processes performed in S627 and S628 in FIGS. 5A and 5B.

Finally, the flow of processing performed in S629 in FIGS. 5A and 5B will be described.

In S629, the CPU 204 uses the script executing unit 414 to execute the script that reflects the execution result sent from the transfer unit 421, and applies the script to the result for the screen display unit 413. Code 702*d* of the HTML data shown in FIG. 7 and code 804 of the JavaScript library 800 are executed in the processing of S629.

The code 804 has a predetermined JavaScript function portion (the code 804*a*) specified as JavaScript code by the request transfer unit 420 and a character string obtainment portion (code 804*b*) for the execution result received from the request transfer unit 420. The code 804*a* provides a returnAppli function generated by the code 902*f* as JavaScript code, and in the first embodiment, carries out a process that substitutes a control result storage variable (code 801*c*) with the execution result passed as an argument.

The code 702*d* carries out a process for reflecting the execution result in the web browser 410. In the present first embodiment, the function of the code 804*b* is called and a process for displaying the character string of the obtained execution result in the screen is executed.

Through the program described thus far, a result of executing the control target application 440 through the web browser 410 in S629 can be applied to the result for the screen display unit 413 and so on.

Although the present first embodiment describes carrying out a process that sets a character string that takes the specified predetermined JavaScript function (the code 804*a*) as an argument, the configuration is not limited as long as code that can be executed as JavaScript is used. Likewise, although the determination as to whether the execution result is a success or failure is displayed through an alert function as a character string in the processing of the code 702*d*, the configuration is not limited as long as the program can be executed as HTML and JavaScript.

The foregoing has been a description of the flow of processes performed in S629 in FIGS. 5A and 5B.

As described thus far, in the first embodiment, the control target application 440 of the image processing apparatus 100 can be executed from the web browser 410 based on class names, function names, and variables written in the JavaScript library 800. Accordingly, when using a local application from the web browser 410, the application can be used as a web browser-based application without adding modifications to the local application, simply by creating a JavaScript library. As such, the number of steps required to develop the program in order to execute the application through the web browser 410 of the image processing apparatus 100 can be reduced.

Second Embodiment

In the aforementioned first embodiment, to execute the control target application 440 from the web browser 410, the web browser 410 sends a control request based on class names, function names, and variables written in the JavaScript library 800 to the request communication unit application 431. The request communication unit application 431 then analyzes the control request and executes the corresponding control target application 440. In other words, until the point in time when the request communication unit application 431 carries out the analysis, the image processing apparatus 100 cannot obtain information of the control target application 440 specified as the control request from the web browser 410. Accordingly, until a control request operation has been received from the user 600, the image processing apparatus 100 cannot determine whether the control request from the web application 400 specified by the user 600 can use the control target application 440.

As such, in a second embodiment, when the web application 400 is launched, a process is carried out for determining whether or not the control target application 440 controlled by that web application 400 can be used. Differences from the first embodiment will be described hereinafter with reference to the drawings. Note that the system configuration and the hardware configurations of the external apparatus 101 and the image processing apparatus 100 according to the second embodiment are the same as in the aforementioned first embodiment, and thus descriptions thereof will be omitted.

Figure 15:
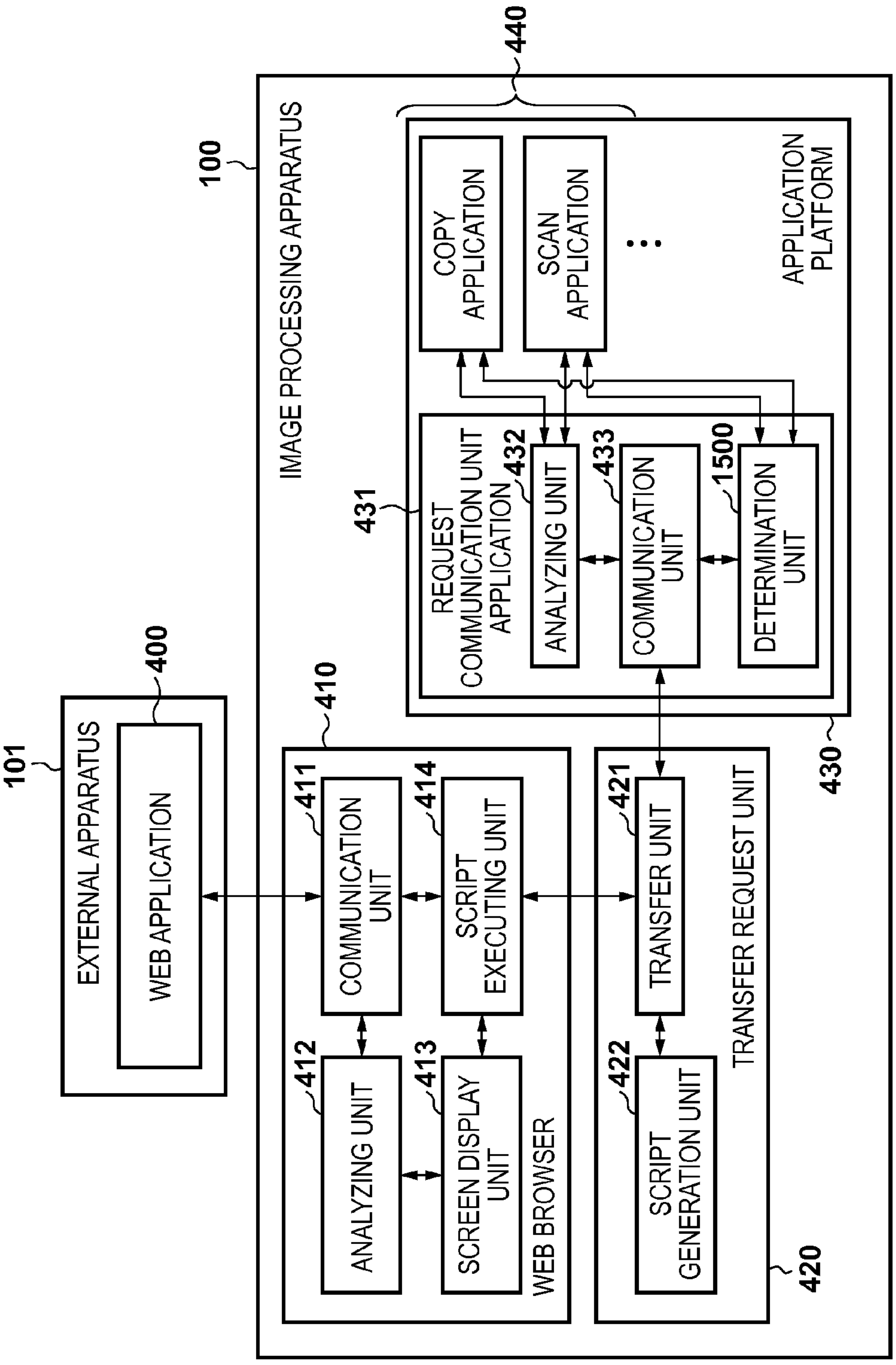
FIG. 15 is a functional block diagram illustrating the software configuration of an external apparatus and an image processing apparatus.

FIG. 15 is a functional block diagram illustrating an example of the software configuration of the external apparatus 101 and the image processing apparatus 100 according to the second embodiment of the present invention. The software configuration illustrated in FIG. 15 is realized by the CPU 204 of the image processing apparatus 100 and the CPU 302 of the external apparatus 101 illustrated in FIG. 2 executing programs. Note that elements indicated by the same numbers as those in the drawings referred to in the first embodiment will be applied to the drawings from FIG. 15 and on, and descriptions of those elements will be omitted.

A determination unit 1500 analyzes used application information received by the communication unit 433, compares an application name and version information of the control target application 440, and determines whether or not the control target application 440 can be used.

Figure 16A:
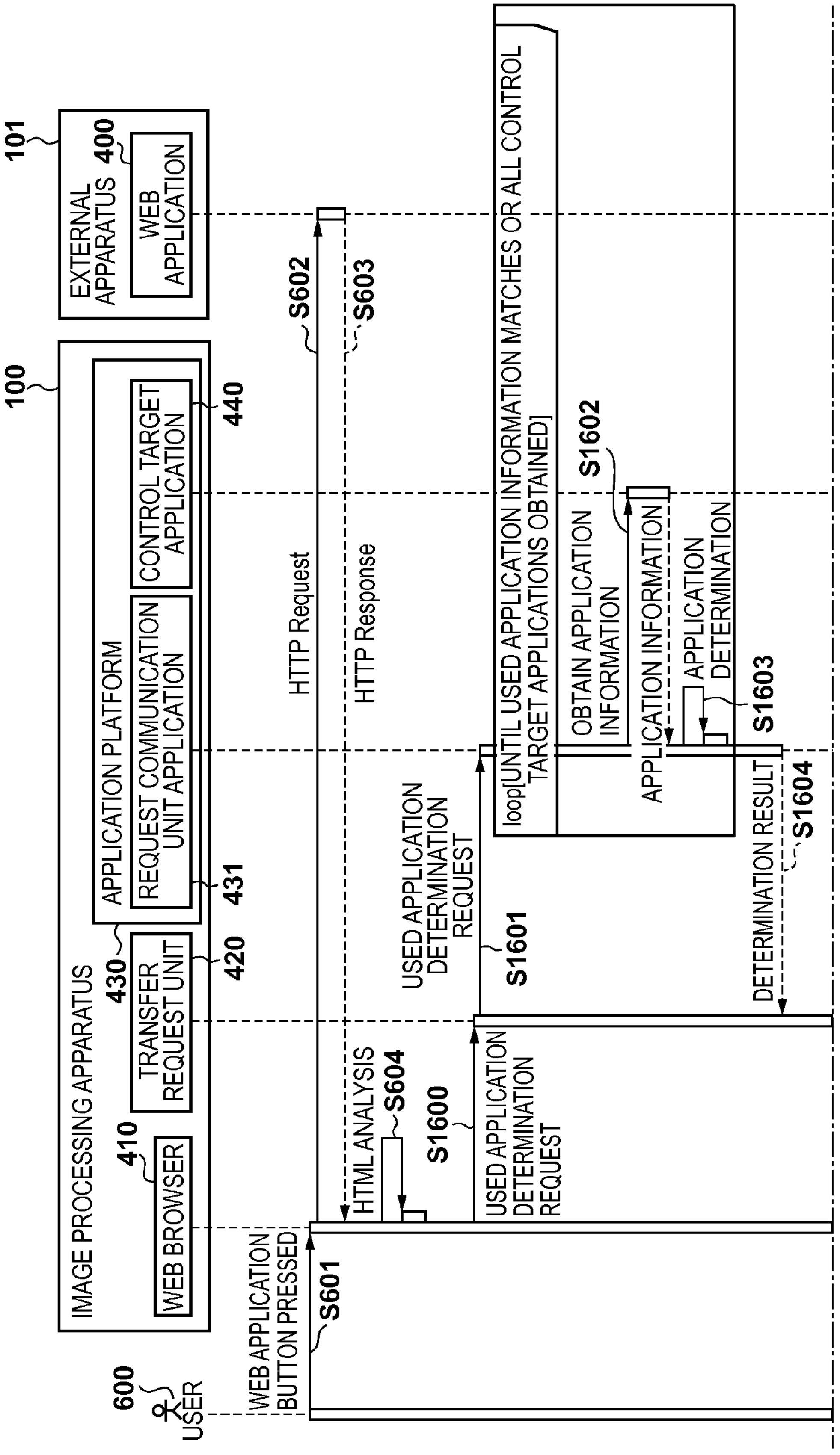
FIGS. 16A and 16B are sequence charts illustrating a flow of processes performed by the image processing apparatus.
Figure 16B:
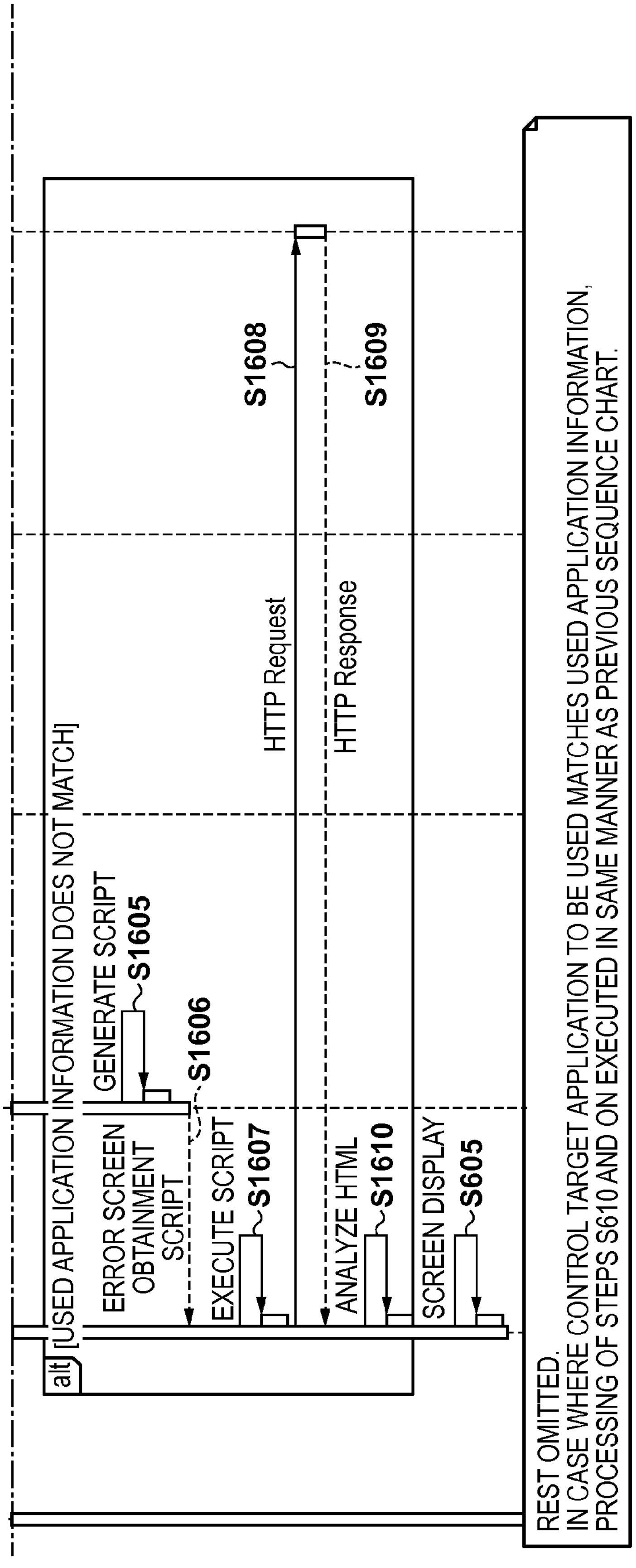

FIGS. 16A and 16B are sequence charts illustrating a flow of processes performed by the image processing apparatus 100 according to the second embodiment. Hereinafter, the flow of processes will be described using this sequence chart, configuration data that realizes each process (FIGS. 17 and 18), and drawings illustrating error screens that are displayed (FIGS. 19A and 19B). Note that the processing according to the second embodiment is executed between S604 and S605 of FIGS. 5A and 5B. As such, descriptions of processes from S610 on are not shown in FIGS. 16A and 16B.

First, the flow of a process of S1600 in FIGS. 16A and 16B will be described.

The CPU 204 uses the script executing unit 414 to execute script data written in the HTML data analyzed in S604. Then, by executing the script data (code 1701 in FIG. 17), the CPU 204 sends, to the transfer unit 421, the used application information regarding the control target application 440 that is used (S1601). Details of the processing of S1600 will be described using the JavaScript library 800 illustrated in FIG. 17.

In the second embodiment, an array (code 1700) sent to the constructor portion (the code 801) in S1600 is added to the JavaScript library 800. A determination function (the code 1701) that sends the used application information to the transfer unit 421 is added as well. The code 1700 includes the used application information, in which is substituted the application name of the control target application 440 and a range of usable application versions, used by the JavaScript library 800. In the present second embodiment, an application name of "Copy_Service" for the control target application 440 and a range of applicable versions from "1.0.2"

to “2.2.1” are consolidated into the used application information. The code 1701 includes a determination start function (code 1702) that sends an array of the used application information (the code 1700) to the request transfer unit 420 as arguments. Like the function of the code 803*b*, the code 1702 is a function definition for calling the callback function of the request transfer unit 420, and the callback function for the request transfer unit 420 is executed when the web browser 410 executes a checkInfo function. At this time, the argument of the code 1702 is sent to the request transfer unit 420 as determination information. In addition to the code 1700 and the code 1701, the HTML data illustrated in FIG. 7 is additionally provided with code that calls the function of the code 1701 in the process of an Init function within the script portion (the code 702) (not shown). The Init function is executed by the screen format definition portion (the code 703) immediately before the operating screen constituted by the analyzed HTML data is displayed. Accordingly, the web application 400 can carry out a determination process for the used application information before launch.

Through the aforementioned program, the web browser 410 executes the checkInfo function (the code 1702) via the Init function by analyzing the HTML data in S604. As a result of the checkInfo function (the code 1702) being executed, the web browser 410 sends the used application information to the request transfer unit 420 (S1600).

The foregoing has been a description of the flow of processes performed in S1600 in FIGS. 16A and 16B.

Next, the flow of processing performed in S1601 in FIGS. 16A and 16B will be described.

After executing a predetermined JavaScript function by the script executing unit 414 in the aforementioned S1600, the CPU 204 reads out the program of the transfer unit 421 that partially constitutes the request transfer unit 420 into the RAM 205 from the storage unit 208. Then, the CPU 204 executes the callback function associated with the execution of the predetermined JavaScript function using the transfer unit 421, and transfers the used application information sent from the script executing unit 414 to the communication unit 433 (S1601). The process of S1601 is the same as the process of S621. In other words, the callback function corresponding to the checkInfo function (the code 1702) specified in the JavaScript library 800 is set (not shown). Furthermore, a structure that sends, to the communication unit 433, the argument received from the checkInfo function within the callback function is defined (not shown).

Through the aforementioned program, when the web browser 410 executes the checkInfo function (S1600), the request transfer unit 420 executes the callback function associated with that function. Then, the request transfer unit 420 transfers the used application information to the request communication unit application 431 (S1601), within that function. The foregoing has been a description of the flow of processes performed in S1601 in FIGS. 16A and 16B.

Next, the flow of a series of processes from S1602 to S1605 in FIGS. 16A and 16B will be described.

Using the communication unit 433 of the request communication unit application 431, the CPU 204 receives the used application information sent by the transfer unit 421 in the aforementioned S1601. Next, the CPU 204 uses the determination unit 1500 to obtain the application information of all of the control target applications (S1602) and compare the used application information (S1603). After this comparison and determination, in S1604, the CPU 204 uses the communication unit 433 to send, to the transfer unit 421, the result of comparing the application information of the control target application 440 with the used application information received from the determination unit 1500.

Details of the processes of S1602 and S1603 will be described with reference to an example of a program that constitutes the request communication unit application 431 illustrated in FIG. 18 and realizes the determination unit 1500. Code 1800 indicates the overall configuration of the program of the determination unit 1500, and includes code 1801 and code 1802. Note that processing that receives the used application information and sends the determination result in S1601 and S1604 is assumed to be executed by the same programs as the code 1101*a* and the code 1101*b* of the communication unit 433, and thus descriptions thereof will be omitted.

The code 1801 is, in the second embodiment, a declaration portion for obtaining information of an application that is run on the application platform 430 by the code 1802. Here, the application is launched using the OSGi (Open Services Gateway initiative platform) framework, and obtains a bundle context object. As such, in the second embodiment, the Java virtual machine that constitutes the application platform 430 includes the OSGi framework. The request communication unit application 431 and the control target application 440 are assumed to be applications that run on the OSGi framework. The OSGi framework provides an environment in which a module system, a Java service platform, and the installing, starting, stopping, and uninstalling of applications can be executed without restarting the Java virtual machine. The OSGi framework manages applications in units called “bundles”. In addition to a Jar file that constitutes the application, the bundle includes a manifest file in which is written metadata such as an application name, version information, and so on. Applications launched as a bundle are managed in the same framework, and thus other bundles can be detected and used as well. Accordingly, by launching the request communication unit application 431 on the OSGi framework and obtaining a bundle context object, the information of all applications run by code 1802*b*, which will be described later, can be obtained.

The code 1802 has a determination unit for the used application information corresponding to S1602 and S1603, and includes code 1802*a* and the code 1802*b*.

The code 1802*a* obtains objects of all applications run on the application platform 430. In the second embodiment, bundle objects regarding all applications run on the OSGi framework are obtained. By obtaining the bundle objects, the determination unit 1500 can refer to the information of manifest files of the applications that are running.

The code 1802*b* compares the application name and version information with the used application information (code 1802*c* and code 1802*d*) for all of the objects obtained by the code 1802*a*, and determines whether the information matches. The code 1802*b* returns a corresponding error code in the case where the application name written in the used application information is not present or in the case where the application name is present but the version information is different, and returns a normal termination code in the case where the information matches.

In the second embodiment, the determination is carried out using the metadata written in the manifest file of the bundle objects of the applications that are running. The code 1802*c* determines whether or not the control target application 440 is present in the image processing apparatus 100 using an application name written in “Bundle-Name” of the manifest file. In the case where the control target application 440 is present, the code 1802*d* obtains version information written in “Bundle-Version” of the manifest file, and determines whether the version is within the applicable version range written in the used application information.

Through the aforementioned program, the request communication unit application 431 obtains the application information of the control target application 440 in S1602, compares that information with the used application information in S1603, and sends a result of the comparison to the request transfer unit 420 in S1604.

The foregoing has been a description of the series of processes from S1602 to S1605 in FIGS. 16A and 16B.

Although the second embodiment describes using an application platform provided by a Java virtual machine that includes the OSGi framework to determine whether the control target application 440 can be used, it should be noted that the configuration is not limited thereto. In other words, any platform may be used as long as an application running on the platform has an application name and version information as metadata and the platform enables that information to be referred to among applications.

Finally, the flow of processing from S1605 to S1610 in FIGS. 16A and 16B will be described.

In S1604, using the transfer unit 421, the CPU 204 receives the result of determining the used application information sent from the communication unit 433, and then executes the program of the script generating unit 422. In the case where the determination result is a normal termination code, the CPU 204 does not carry out any processing, and displays the screen analyzed in S604 (S605). However, in the case where the determination result is an error code, the CPU 204 creates JavaScript code for displaying an error screen in S1605. Thereafter, in S1606, the CPU 204 uses the transfer unit 421 to send, to the script executing unit 414 of the web browser 410, the JavaScript code generated by the script generating unit 422. Then, in S1607, the CPU 204 uses the script executing unit 414 to execute the JavaScript code for displaying the error screen sent from the transfer unit 421.

Next, in S1608, the CPU 204 sends an HTTP Request from the communication unit 433 to the external apparatus 101 via the network I/F 201 based on a URL indicating a location where the JavaScript code error screen configuration data of the web application 400 is stored. As a result, the CPU 302 of the external apparatus 101 receives the HTTP Request via the network I/F 301. Then, in S1609, the CPU 302 sends an HTTP Response, in which is included the error screen data (HTML) of the web application 400, from the storage unit 304 to the image processing apparatus 100 via the network I/F 301. Through this, in S1610, the CPU 204 of the image processing apparatus 100 uses the analysis unit 412 to analyze the data received by the communication unit 411 via the network I/F 201, and in S605, displays the error screen in the display unit 203 through the screen display unit 413.

S1605 and S1606, S1607, and S1608 to S1610 carry out the same processing as S627 and S628, S629, and S602 to S604, respectively. In other words, in S1605, a JavaScript code character string is created based on the determination result from the determination unit 1500. Next, the character string is converted into JavaScript code in S1606, and the execution result is transferred to the web browser 410 as a result of calling a function of the script executing unit 414 that takes that code as an argument. Then, in S1607, the script is executed by the web browser 410, and the error screen display that reflects the determination result is carried out by the screen display unit 413 from S1608 to S1610.

In the second embodiment, in S1605, the created JavaScript code character string is set as a script that transitions the screen based on the error code (not shown). Here, in the case of an error code indicating that an application is not present, string returnResult="location.replace ('http://192.168.xx.xxx/errorName.html');"; is generated. Likewise, in the case where the version information does not match, string returnResult="location.replace('http://192.168.xx.xxx/errorVersion.html');"; is generated (not shown). Then, based on the URL written in the script, the error screen illustrated in FIG. 19A is displayed for the former case, and the error screen illustrated in FIG. 19B is displayed for the latter case. As such, an HTML data obtainment request to the external apparatus 101 (S1608, S1609) and an HTML data analysis process (S1610) are included.

FIGS. 19A and 19B are diagrams illustrating examples of the error screens displayed by the image processing apparatus 100 according to the second embodiment, where FIG. 19A illustrates an example of a screen in the case of an error indicating that no application is present and FIG. 19B is an example of an error screen in the case where the version information does not match.

Through the aforementioned program, the request transfer unit 420 generates JavaScript code that displays an error screen in the web browser 410 in the case where the determination result indicates an error, and sends that code to the web browser 410 (S1605, S1606). The web browser 410 executes the received JavaScript code (S1607), obtains and analyzes the HTML data that constitutes the error screen, and displayed the screen (S1608, S1609, S1610).

Although in the second embodiment, the HTML data of the error screen to be displayed is stored in the web application 400 of the external apparatus 101 and obtained by specifying a URL using JavaScript code, it should be noted that the configuration is not limited thereto. In other words, the configuration is not limited as long as the configuration enables the display of an error screen indicating that an application is not present or that version information does not match to be executed through the generation and execution of JavaScript code.

The foregoing has been a description of the flow of processes performed from S1605 to S1610 in FIGS. 16A and 16B.

According to the second embodiment as described thus far, when using a local application through the web browser 410, it can be determined whether or not the web application 400 can be used when that web application is launched.

The present invention is not intended to be limited to the foregoing embodiments, and many modifications and variations can be made thereon without departing from the spirit and scope of the present invention.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-106458, filed May 22, 2014, which is hereby incorporated by reference herein in its entirety.

What is claimed is:

1. An image processing apparatus comprising:

one or more processors; and at least one memory coupled to the one or more processors, the at least one memory having an application stored thereon which executes a function of the image processing apparatus, and the at least one memory having instructions stored thereon which, when executed by the one or more processors, cause the image processing apparatus to:

receive, by a Web browser, from a Web server, at least operating screen information and information regarding a class name and a function name of the application, display, by the Web browser, an operating screen based on the operating screen information, in a case where a control request is received via the operating screen displayed by the Web browser, convert, by a first program, a form of the control request including the class name and the function name of the application into another form to be analyzed by a second program, transfer, by the first program, the control request form of which is converted, to the second program, analyze, by the second program, the transferred control request form, and specify information of an application to be executed, and execute, by the second program, the application corresponding to the specified information by loading a class of the application corresponding to the specified information and calling an execution function based on the transferred control request form, wherein the first program and the second program differ from the Web browser and the application to be executed, and the application to be executed is the application which is available for the Web browser or the application which is not available for the Web browser.

2. The image processing apparatus according to claim 1, wherein the Web browser displays the operating screen by obtaining HTML data from the Web server connected over a network and generates the control request form by executing a script included in the HTML data in response to a user operation made through the operating screen.

3. The image processing apparatus according to claim 2, wherein the at least one memory has further instructions stored thereon which, when executed by the one or more processors, cause the image processing apparatus to transfer, by the Web browser, an argument of a callback function associated with the script executed by the Web browser, to the first program.

4. The image processing apparatus according to claim 2, wherein the script is JavaScript.

5. The image processing apparatus according to claim 1, wherein the at least one memory has further instructions stored thereon which, when executed by the one or more processors, cause the image processing apparatus to transfer, by the second program, a result of executing the application, to the first program.

6. The image processing apparatus according to claim 5, wherein the at least one memory has further instructions stored thereon which, when executed by the one or more processors, cause the image processing apparatus to generate, by the first program, a script based on the result of executing the application and send the generated script to the Web browser.

7. The image processing apparatus according to claim 1, wherein the at least one memory has further instructions stored thereon which, when executed by the one or more processors, cause the image processing apparatus to execute, by the second program, a function of a control API of the application.

8. The image processing apparatus according to claim 1, wherein the at least one memory has further instructions stored thereon which, when executed by the one or more processors, cause the image processing apparatus to determine, by the second program, whether or not the function name of a control API of an application class included in the control request is present, execute, by the second program, a function of the control API of the application using an argument of the function of the control API in a case where the function name is present, and return, by the second program, an error in a case where the function name is not present.

9. The image processing apparatus according to claim 1, wherein the control request includes at least one of an application name and version information of the application; and the at least one memory has further instructions stored thereon which, when executed by the one or more processors, cause the image processing apparatus to determine, by the second program, whether or not an executable application is present based on at least one of the application name and the version information of the application.

10. The image processing apparatus according to claim 1, wherein the at least one memory has further instructions stored thereon which, when executed by the one or more processors, cause the image processing apparatus to load, by the second program, the class of the application based on a Java script library that manages classes of applications that run on the image processing apparatus.

11. The image processing apparatus according to claim 1, wherein the at least one memory has further instructions stored thereon which, when executed by the one or more processors, cause the image processing apparatus to determine, by the second program, whether the specified information exists in information regarding each of applications in the image processing apparatus, and execute, by the second program, the application corresponding to the specified information by loading the class of the application corresponding to the specified information and calling the execution function based on the transferred control request form, in a case where it is determined that the specified information exists.

12. A control method of an image processing apparatus that controls the image processing apparatus having a Web browser and including an application that executes a function, the method comprising:

receiving, by the Web browser, from a Web server, at least operating screen information and information regarding a class name and a function name of the application, displaying, by the Web browser, an operating screen based on the operating screen information;

in a case where a control request is received via the operating screen displayed by the Web browser, converting, by a first program, a form of the control request including the class name and the function name of the application into another form to be analyzed by a second program;

transferring, by the first program, the control request form of which is converted, to a second program;

analyzing, by the second program, the transferred control request form, and specifying information of an application to be executed; and executing, by the second program, the application corresponding to the specified information by loading a class of the application corresponding to the specified information and calling an execution function based on the transferred control request form, wherein the first program and the second program differ from the Web browser and the application to be executed, and the application to be executed is the application which is available for the Web browser or the application which is not available for the Web browser.

13. A non-transitory computer-readable storage medium in which is stored a program that causes a computer to:

receive, by a Web browser, from a Web server, at least operating screen information and information regarding a class name and a function name of an application;

display, by the Web browser, an operating screen based on the operating screen information;

in a case where a control request is received via the operating screen displayed by the Web browser, convert, by a first program, a form of the control request including the class name and the function name of the application into another form to be analyzed by a second program, transfer, by the first program, the control request form of which is converted, to a second program;

analyze, by the second program, the transferred control request form, and specify information of an application to be executed; and execute, by the second program, the application corresponding to the specified information by loading a class of the application corresponding to the specified information and calling an execution function based on the transferred control request form, wherein the first program and the second program differ from the Web browser and the application to be executed, and the application to be executed is an application which is available for the Web browser or an application which is not available for the Web browser.

* * * * *